Oct. 28, 1958
C. E. FOX
2,857,750
SAFETY CLUTCH
Filed May 1, 1956
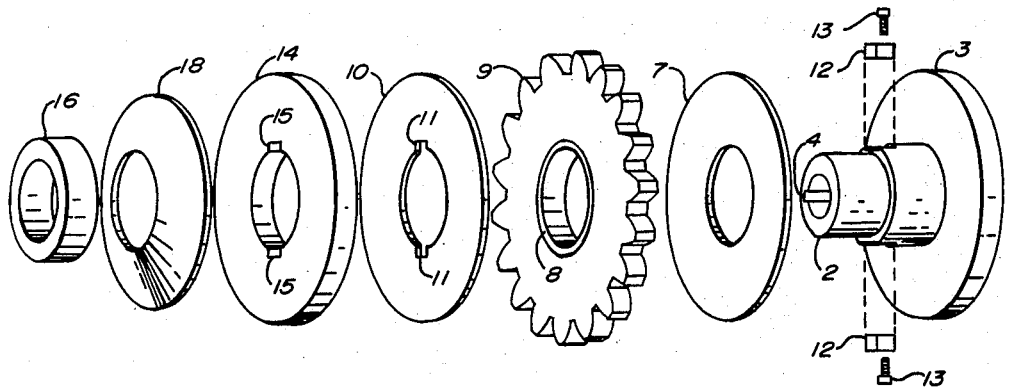
*Fig. I*
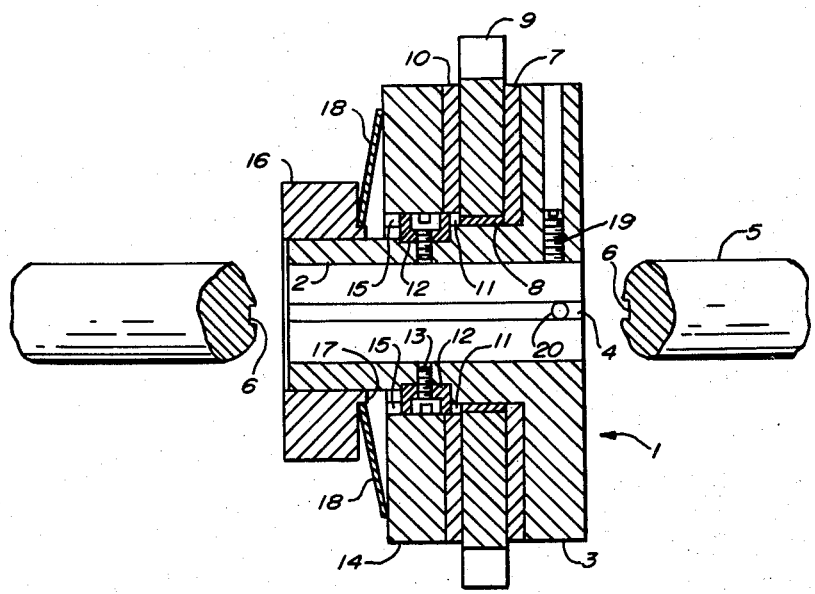
*Fig. II*
INVENTOR.
CARL E. FOX
BY
Marshall, Marshall & Yeasting
ATTORNEYS

United States Patent Office 2,857,750
Patented Oct. 28, 1958

2,857,750

SAFETY CLUTCH

Carl E. Fox, Vickery, Ohio

Application May 1, 1956, Serial No. 581,866

7 Claims. (Cl. 64—30)

This invention relates to safety clutches such as are interposed between driving mechanism and driven mechanism to prevent damage which might occur if the driven mechanism should be stopped or should become overloaded while the driving mechanism is operating. The safety clutch of this invention may be interposed between a shaft that is turned by a motor or an engine or other prime mover and a gear wheel, sprocket, pulley, cutting disc or other machine element to be driven. Conversely the safety clutch of this invention may be interposed between a driving machine element such as a gear wheel, sprocket or gear and a shaft to be turned thereby.

Safety clutches in the field to which this invention relates often have been erratic in operation. They were liable to disconnect from each other the driven mechanism and driving mechanism between which the safety clutches were interposed at times when no stoppage and no intolerable overload of the driven mechanism had occurred, and to disconnect upon slight acceleration of driving mechanism or slight increase in motive power. Their parts were also liable to freeze together or seize upon each other and thus fail to release the driven mechanism from the driving mechanism upon occasions when release became necessary to prevent damage.

The principal object of this invention is to so improve safety clutches of the class to which this invention belongs as to render them more nearly infallible.

Another object of the invention is to provide a safety clutch which can be set to release, upon an increase in overload, with a tolerance and much closer than has heretofore been attainable.

Another object is to provide a safety clutch which when set to release upon a definite increase in overload, will retain such setting more closely than comparable settings have been retained by prior devices in the field in which this invention relates.

And still another object is to provide a safety clutch which will infallibly release upon stoppage of mechanism which is being driven through such safety clutch.

Other objects and various advantages of the invention will become apparent upon perusal of the following specification illustrated by the accompanying drawings, in which:

Fig. I is an isometric exploded view showing elements of the clutch structure and their relationship to each other.

Fig. II is a cross sectional view on an enlarged scale taken on a plane passing through the axis of rotation of the safety clutch.

The safety clutch structure of this embodiment includes a hub 1 which comprises a sleeve 2 and an integral heavy flange 3. A longitudinally extending hub keyway 4 is cut within the sleeve 2 to receive a key fastening the hub upon a shaft 5 having a keyway 6 to register with the hub keyway 4.

Turnably mounted upon the sleeve 2 and lying against a face of the flange 3 is a washer-like ring 7 of fiberboard of the type which is commercially available for use in clutch plate facings, brake linings, etc. Also turnably mounted on the sleeve 2 is a bushing 8. The hub 1 is preferably made of high grade cast iron, while the bushing 8 is made of porous nonferrous metal impregnated with lubricant.

In the form of device illustrated, a gear wheel 9 is mounted on the bushing 8. The gear wheel 9 may be made of steel or iron; and the sleeve 2, the bushing 8 and the gear wheel 9 may fit together for relative rotation without appreciable play, there being no liability of seizure between the sleeve 2 and the gear wheel 9 or of coalescence of the parts through corrosion.

Surrounding the sleeve 2 and lying against the side of the gear wheel 9 is another ring 10 of suitable fiber board. The ring 10 differs from the ring 7 in having notches 11 to receive a pair of lugs 12 which are fastened to the sleeve 2 by means of cap screws 13. The lugs 12 when engaged in the notches 11 of the ring 10 cause the ring 10 to rotate with the sleeve 2.

An annulus 14, which may be thicker than either of said rings and similar in size and shape to the heavy flange 3, is slid upon the sleeve 2 to lie against the notched ring 10. The annulus 14 has notches 15 which receive the lugs 12. Thus the annulus 14 is caused to rotate with the hub 1.

The end of the sleeve 2 which is remote from the flange 3 is reduced in outer diameter and is threaded to receive a nut 16 having a ridge 17 which enters and locates a frusto-conical spring 18.

By turning up the nut 16 and thus forcing the frusto-conical spring 18 against the heavy annulus 14, the fiber board rings 7 and 10 may be squeezed between the annulus 14, the gear wheel 9 and the flange 3 to the extent necessary to cause the gear wheel 9 to rotate with the hub 1 so long as the hub 1 is turned with normal power and mechanism to which the gear wheel 9 is connected is not subjected to stoppage or intolerable overload.

The hub 1 is prevented from shifting longitudinally of the shaft by a set screw 19, and a set screw 20 prevents slippage of the key which lies in the keyways 4 and 6.

No attempt is made herein to explain the physical phenomena which enable the device of this invention to be adjusted so that the clutch will slip at a predetermined overload and which enable the device to retain such adjustment under various conditions of usage. It is sufficient to observe that when neither of the fiber board rings 7 and 10 is locked to the hub 1 or when the fiber board rings 7 and 10 both are locked to the hub 1, the clutch will not function consistently. It is only when one only of the fiber board rings 7 or 10 is locked to the hub 1 and the other of the rings is not locked to the hub 1 that consistent functioning is achieved. It has also been observed that when the friction reducing bushing 8 is omitted and the gear wheel 9 is mounted directly on the sleeve 2 seizure or coalescence between the gear wheel and the sleeve may render the functioning of the safety clutch uncertain, particularly when the device is operated under conditions in which corrosion may occur.

With the device assembled in the manner shown by Fig. II of the drawings, it may be adjusted with lasting accuracy by using a Prony brake to indicate the loading at which the clutch will slip at the normal speed of operation.

The device as illustrated and described herein is to be regarded as exemplary only and it is to be understood that the invention is subject to modification within the spirit and scope of the subjoined claims.

I claim:

1. A safety clutch comprising, in combination, a hub adapted to be fixed upon a shaft, said hub consisting of a sleeve having a flat surfaced flange surrounding one end thereof, a ring of fiber board surrounding and being turnable about said sleeve, said ring having a flat surface on each side thereof, one of the flat surfaces of said ring lying against the flat surface of said flange, a friction reducing bushing surrounding said sleeve adjacent said ring, an element to be driven mounted upon said bushing, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus mounted upon said sleeve, said annulus having a flat surface lying against the other flat surface of said second ring, means including a frusto-conical spring and a nut threaded upon said sleeve for adjustably squeezing said rings of fiber board between said flange, said element to be driven and said annulus and thereby heightening the coefficient of friction therebetween, and means for preventing said annulus and said second one only of said rings of fiber board from turning relative to said sleeve.

2. A safety clutch comprising, in combination, a hub adapted to be fixed upon a shaft, said hub consisting of a sleeve having a heavy flat surface flange surrounding one end thereof, said hub and flange being integral, a ring of fiber board surrounding said sleeve, said ring having a flat surface on each side thereof, one of the flat surfaces of said ring lying against the flat surface of said flange, a friction reducing bushing surrounding said sleeve adjacent said ring, an element to be driven mounted upon said bushing, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus, which is thicker than either of said rings and similar in size and shape to said flange, mounted upon said sleeve, said annulus having a flat surface lying against the other flat surface of said second ring, means including a frusto-conical spring and a nut threaded upon said sleeve for adjustably squeezing said rings of fiber board between said flange, said element to be driven and said annulus and thereby heightening the coefficient of friction therebetween, and means for preventing said annulus and one only of said rings of fiber board from turning relative to said sleeve.

3. A safety clutch comprising, in combination, a hub adapted to be fixed upon a shaft, said hub consisting of a sleeve having a flat surfaced flange surrounding one end thereof, a ring of fiber board surrounding said sleeve, said ring having a flat surface on each side thereof, one of the flat surfaces of said ring lying against the flat surface of said flange, a friction reducing bushing surrounding said sleeve adjacent said ring, an element to be driven mounted upon said bushing, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus mounted upon said sleeve, said annulus having a flat surface lying against the other flat surface of said second ring, means including a frusto-conical spring and a nut threaded upon said sleeve for adjustably squeezing said rings of fiber board between said flange, said element to be driven and said annulus and thereby heightening the coefficient of friction therebetween, and means for preventing said annulus and one only of said rings of fiber board from turning relative to said sleeve.

4. A safety clutch comprising, in combination, a hub adapted to be fixed upon a shaft, said hub consisting of a sleeve having a flat surfaced flange surrounding one end thereof, a ring of fiber board surrounding and being turnable about said sleeve, said ring having a flat surface on each side thereof, one of the flat surfaces of said ring lying against the flat surface of said flange, an element to be driven, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus mounted upon said sleeve, said annulus having a flat surface lying against the other flat surface of said second ring, means including a frusto-conical spring and a nut threaded upon said sleeve for adjustably squeezing said rings of fiber board between said flange, said element to be driven and said annulus and thereby heightening the coefficient of friction therebetween, and means for preventing said annulus and said second one only of said rings of fiber board from turning relative to said sleeve.

5. A safety clutch comprising, in combination, a hub, said hub consisting of a sleeve having a heavy flat surfaced flange surrounding one end thereof, said hub and flange being integral, a ring of fiber board surrounding said sleeve, said ring having a flat surface on each side thereof, one of the flat surfaces of said ring lying against the flat surface of said flange, a friction reducing bushing surrounding said sleeve adjacent said ring, an element to be driven mounted upon said bushing, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus, which is thicker than either of said rings and similar in size and shape to said flange, mounted upon said sleeve, said annulus having a flat surface lying against the other flat surface of said second ring, means for adjustably squeezing said rings of fiber board between said flange, said element to be driven and said annulus and thereby heightening the coefficient of friction therebetween, and means for preventing said annulus and one only of said rings of fiber board from turning relative to said sleeve.

6. A safety clutch comprising, in combination, a hub, said hub consisting of a sleeve having a flat surfaced flange surrounding one end thereof, a ring of fiber board surrounding said sleeve, said ring having a flat surface on each side thereof, one of the flat surfaces of said ring lying against the flat surface of said flange, an element to be driven, said element having a flat surface on each side thereof, one of the flat surfaces of said element lying against a flat surface of said ring, a second ring of fiber board surrounding said sleeve said second ring having a flat surface on each side thereof one of which engages the other flat surface of said element to be driven, an annulus mounted upon said sleeve, said annulus having a flat surface lying against the other flat surface of said second ring, means for adjustably squeezing said rings of fiber board between said flange, said element to be driven and said annulus and thereby heightening the coefficient of friction therebetween, and means for preventing said annulus and one only of said rings of fiber board from turning relative to said sleeve.

7. A safety clutch comprising, in combination, elements having a pair of driving faces and a pair of driven faces, all rotatable about a common axis, a member interposed between one of said driving faces and one of said driven faces, said member having surfaces frictionally engaging said faces but otherwise being free to rotate independently thereof, a second member interposed between the other of said driving faces and the other of said driven faces, said second member having surfaces frictionally engaging the faces between which said second member is interposed, said second member being otherwise free to rotate independently of one of the faces, means for locking said second member against rotation relative to the other of the faces between which said second member is interposed, and means for adjusting the pressure with which said surfaces engage said faces.

References Cited in the file of this patent

UNITED STATES PATENTS 2,241,689   Whittaker _____ May 13, 1941
2,651,530   Blydenburgh _____ Sept. 8, 1953